US006479771B1

United States Patent
Kubota (12) 
(10) Patent No.: US 6,479,771 B1
(45) Date of Patent: Nov. 12, 2002

(54) LEVER SWITCH AND CONTACT ASSEMBLY

(75) Inventor: Minoru Kubota, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 150 days.

(21) Appl. No.: 09/649,580

(22) Filed: Aug. 29, 2000

(30) Foreign Application Priority Data

Aug. 31, 1999 (JP) .......................................... 11-245213

(51) Int. Cl.$^7$ ............................ H01H 3/00; H01H 9/00; H01H 25/04
(52) U.S. Cl. ...................... 200/61.27; 200/4; 200/11 R; 200/11 G; 200/18
(58) Field of Search ...................... 200/4, 61.27, 61.38, 200/61.54–61.57, 11 R, 11 G, 17 R, 18

(56) References Cited

U.S. PATENT DOCUMENTS

| | | | | |
|---|---|---|---|---|
| 4,273,971 A | * | 6/1981 | Tregurtha | 200/4 |
| 4,379,954 A | * | 4/1983 | Iwata et al. | 200/4 |
| 5,047,600 A | * | 9/1991 | Enari et al. | 200/61.54 |
| 5,575,177 A | * | 11/1996 | Poleschuk et al. | 200/61.3 X |
| 5,804,782 A | * | 9/1998 | Newman et al. | 200/61.27 |

FOREIGN PATENT DOCUMENTS

JP          10-233144          9/1988

* cited by examiner

Primary Examiner—J. R. Scott
(74) Attorney, Agent, or Firm—Armstrong, Westerman & Hattori, LLP (57) ABSTRACT

The lever switch has a shaft, an operating body turnable around the shaft, and a contact assembly. The contact assembly includes a movable contact piece turning in response to the turn of the operating body, a fixed contact piece secured to the shaft and slidingly contacting the movable contact piece, and a movable contact piece retainer disposed between the operating body and the fixed contact piece for retaining the movable contact piece. The movable contact piece retainer is opposed to the operating body and the fixed contact piece in the longitudinal direction of the shaft. A first clearance is provided between the movable contact piece retainer and the fixed contact piece in the longitudinal direction of the shaft, and a second clearance is provided between the movable contact piece retainer and the operating body in the longitudinal direction of the shaft.

5 Claims, 7 Drawing Sheets

LEVER SWITCH AND CONTACT ASSEMBLY

BACKGROUND OF THE INVENTION

1. Field of the Invention

The present invention relates to a lever switch mounted on a steering column of an automobile vehicle such as a car, in particular to the lever switch having a contact assembly including a movable contact piece and a fixed contact piece.

2. Related Art

A car has a lever switch generally mounted on a steering column for operation of various equipment including lighting devices, wipers, turn signal lamps, and so on.

Furthermore, the lever switch has an adjustment device for adjusting a force to turn the operating body and has a push device for resiliently urging the movable contact piece toward the fixed contact piece for electrical connection thereof. Each of the adjustment device and the push device has a spring as a resiliently urging means. Each spring has a relatively strong resilient force to bias the movable contact piece directly or through the operating body toward the fixed contact piece.

For example, Japanese Patent Application Laid-open NO. H. 10-233144 discloses a lever switch having a movable contact piece that is a roller rolling on a fixed contact piece. The roller is resiliently urged by a push device consisting of a coil spring toward the fixed contact piece.

The conventional lever switch has a adjustment device for the turning force of the operating body. The turning of the operating body around the shaft causes the coil spring of the adjustment device to adjust the force resiliently exerted on the movable contact piece toward the fixed contact piece. Thereby, in response to the turning of the operating body, the force abutting the movable contact piece against the fixed contact piece is variable. This may not provide a stable constant contact force between the movable contact piece and the fixed contact piece.

Furthermore, an incorrect electrical connection between the movable contact piece and the fixed contact piece may occur due to a with-time degradation of at least one of the movable contact piece and the fixed contact piece. The degradation is caused by the repeated turning of the operating body, the variation of the force abutting the movable contact piece against the fixed contact piece, and the resilient force of the coil springs of the adjustment device and the resiliently pushing device.

THE SUMMARY OF THE INVENTION

In view of the disadvantages of the conventional lever switch, an object of the present invention is to provide a lever switch having a contact assembly to ensure a stable correct electrical connection between a movable contact piece and a fixed contact piece.

For achieving the object, a lever switch according to the present invention has a shaft, an operating body turnable around the shaft, and a contact assembly. The contact assembly includes a movable contact piece turning in response to the turn of the operating body, a fixed contact piece secured to the shaft and slidingly contacting the movable contact piece, and a movable contact piece retainer disposed between the operating body and the fixed contact piece for retaining the movable contact piece. The movable contact piece retainer is opposed to the operating body and the fixed contact piece in the longitudinal direction of the shaft. A first clearance is provided between the movable contact piece retainer and the fixed contact piece in the longitudinal direction of the shaft, and a second clearance is provided between the movable contact piece retainer and the operating body in the longitudinal direction of the shaft.

As described above, the movable contact piece retainer is disposed between the fixed contact piece and the operating body with the clearances therebetween. Thus, the push force exerted on the fixed contact piece by the operating body through the movable contact piece retainer is adjusted by the clearances. Hence, the contact force provided between the movable contact piece and the fixed contact piece is adjusted in variation thereof.

Preferably, the movable contact piece retainer is formed in a circular ring shape. A fixed body is secured to the shaft and positioned adjacent to an inner periphery of the movable contact piece retainer, the fixed body being axially opposed to the operating body. A resiliently urging means is mounted between the fixed body and the operating body to resiliently bias the operating body in the direction opposed to the fixed body. A third clearance is provided between the fixed body and the operating body. The third clearance is smaller than the second clearance.

Thus, on turning the operating body, the operating body does not abut against the movable contact piece retainer, even when the operating body makes contact with the fixed body, that is, with the fixed contact piece against the resilient force of the resiliently urging means. That is because the third clearance is smaller than the second clearance.

This retards a force abutting the movable contact piece against the fixed contact piece, when the turning of the operating body moves the movable contact piece toward the fixed contact piece via the movable contact piece retainer.

Preferably, the resiliently urging means is axially positioned in a recess of the operating body, and the fixed body is formed in a cylindrical shape. The fixed body has a cam end wall opposed to the operating body. The cam end wall is inclined in axial and circumferential radial directions of the fixed body. The cam end wall abuts against a rolling body resiliently urged by the resiliently urging means toward the fixed body such that the rolling body can roll on the cam end wall.

Thus, the rolling body rolling on the cam wall moves the operating body in a direction opposed to the fixed body via the resiliently urging means.

The operating body may be formed with a first projection and a first depression which are opposed to the movable contact piece retainer at one end of the operating body, while the movable contact piece retainer is formed with a second projection and a second depression which are opposed to the operating body at one end of the movable contact piece retainer. The first projection engages with the second depression and the second projection engages with the first depression so that the operating body can turns around the shaft together with the movable contact piece retainer.

Thus, the turning of the operating body surely turns the movable contact piece via the movable contact piece retainer.

Preferably, the movable contact piece makes contact with the fixed contact piece, and the movable contact piece is a flat spring resiliently urging the movable contact piece retainer in a direction opposed to the fixed contact piece.

This further retards a force abutting the movable contact piece against the fixed contact piece, when the turning of the operating body moves the movable contact piece toward the fixed contact piece via the movable contact piece retainer.

DETAILED DESCRIPTION OF THE PREFERRED EMBODIMENT

Referring to FIGS. 1 to 7, an embodiment of the present invention will be discussed.

Figure 1:
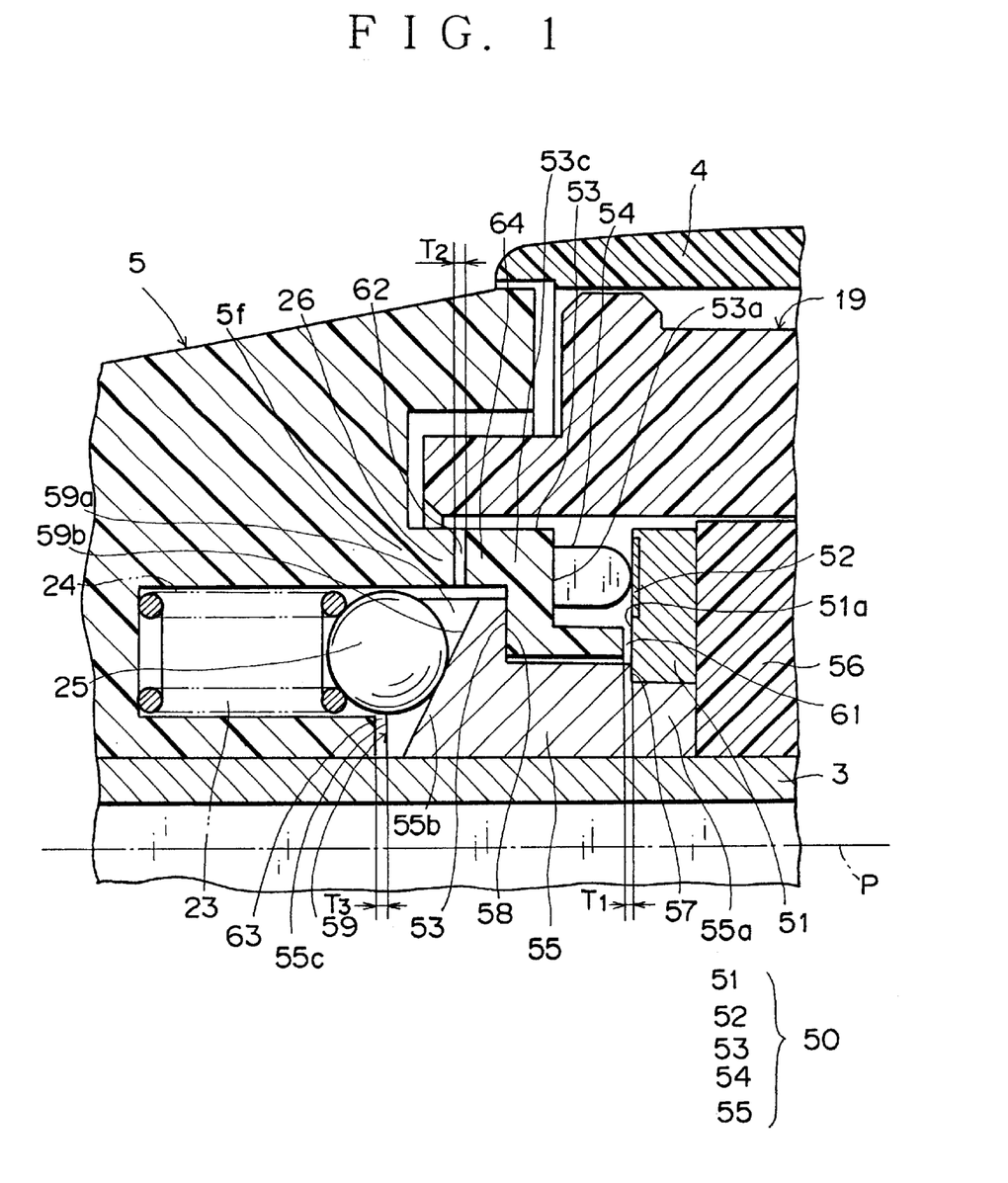
FIG. 1 is a sectional view showing a contact assembly of a lever switch of an embodiment according to the present invention.

FIG. 1 shows a contact assembly 50 of the embodiment, which constitutes a lever switch 1 shown in FIGS. 4 to 7.

The lever switch 1 is mounted on a steering column of a steering wheel of an automobile vehicle. The lever switch 1 is used to operate equipment such as a car radio and a car navigation system.

Figure 5:
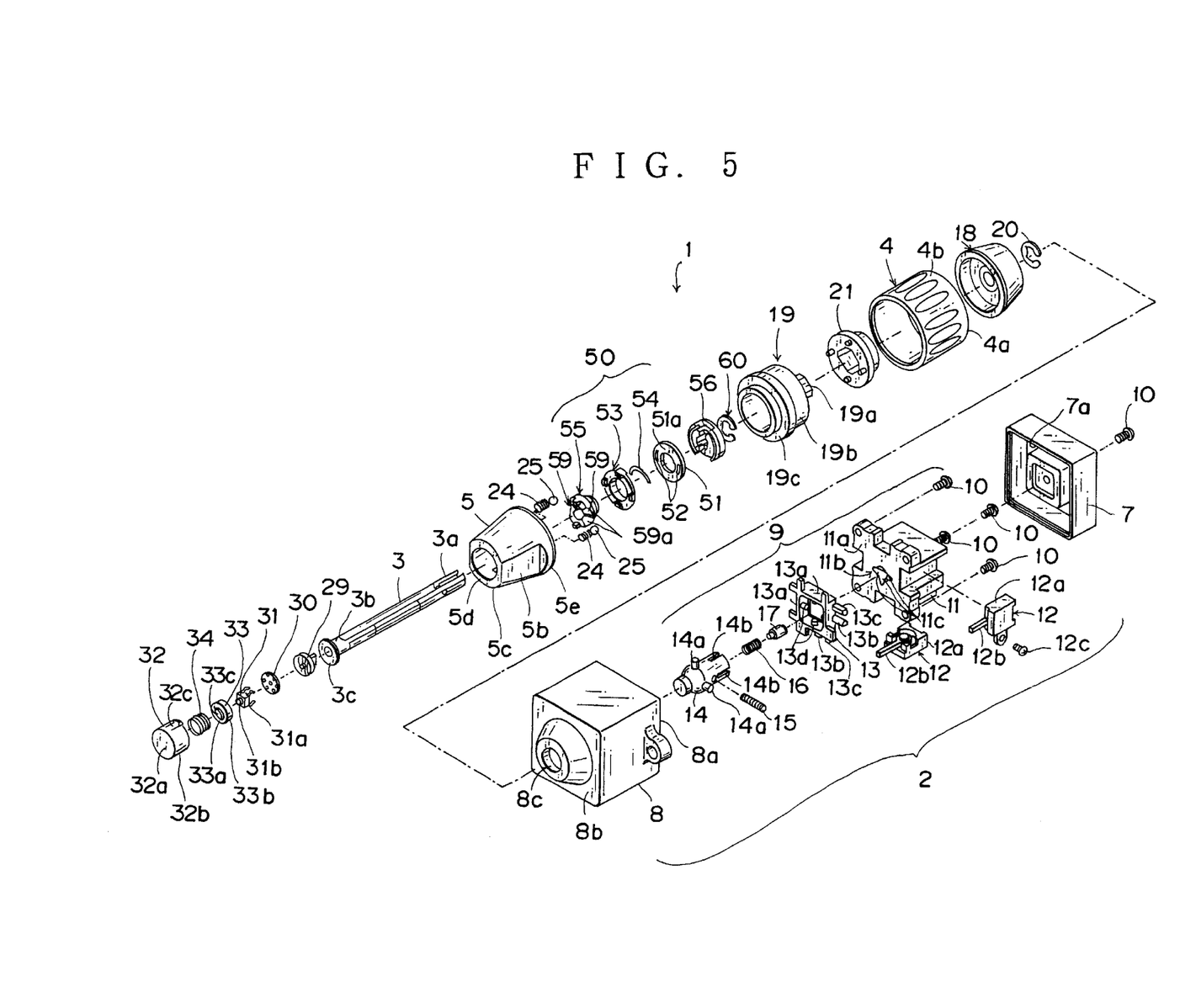
FIG. 5 is an exploded perspective view showing the lever switch of FIG. 4.
Figure 6:
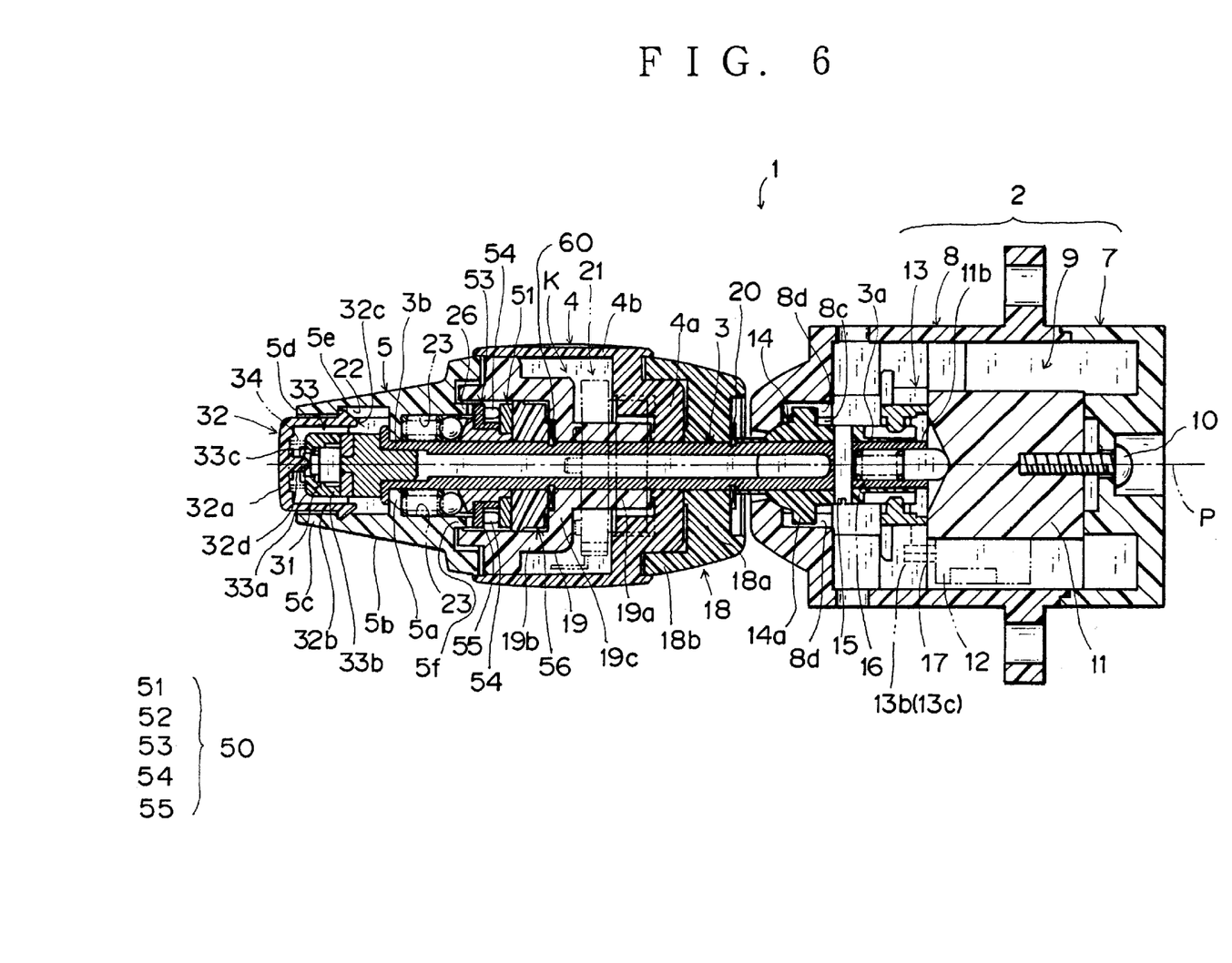
FIG. 6 is a sectional view taken along line VI—VI of FIG. 4.
Figure 7:
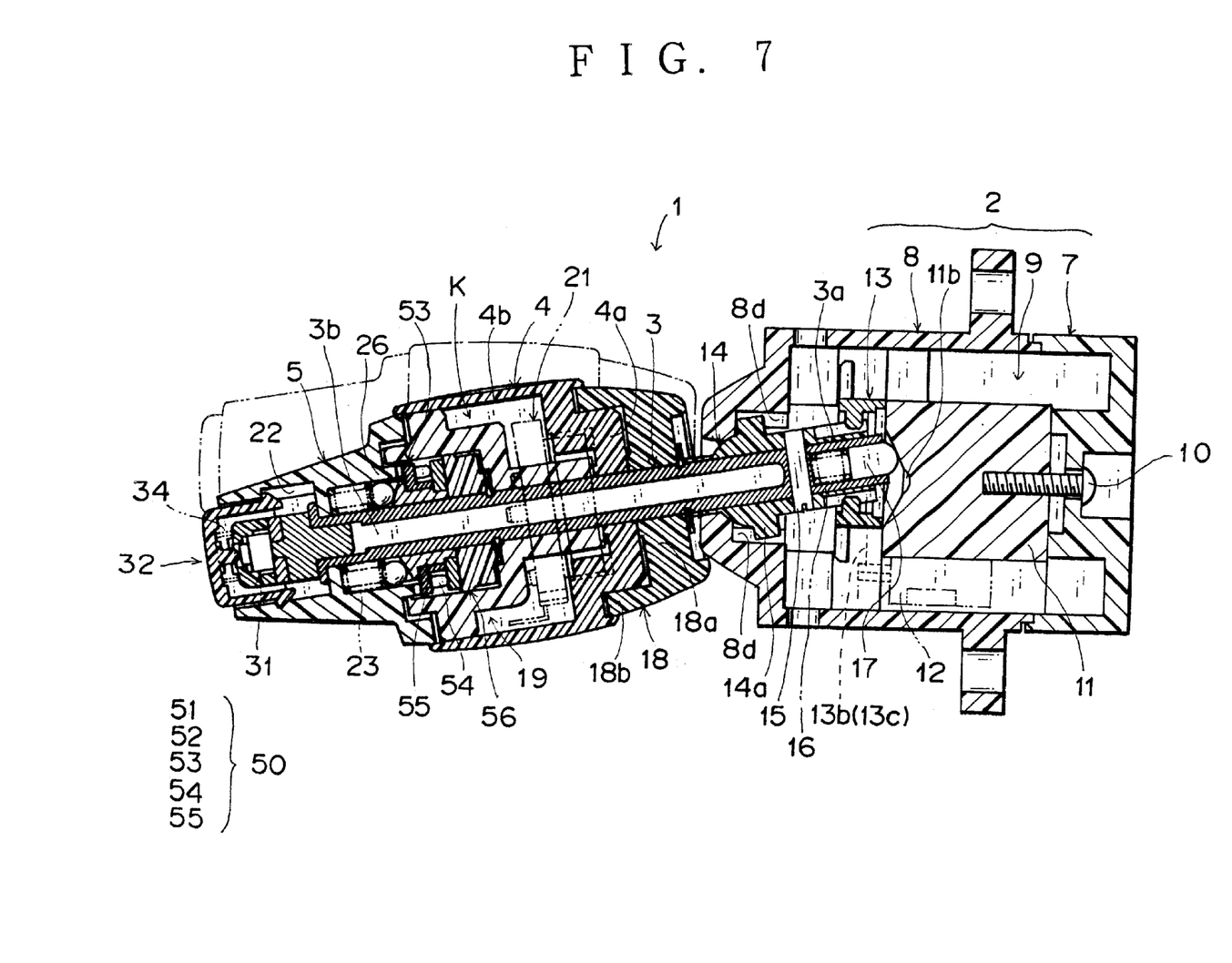
FIG. 7 is a sectional view showing the lever switch in which the operating shaft has been pivoted.

The lever switch 1, as illustrated in FIGS. 5 to 7, has a base case 2, an operating shaft 3, a first operating body 4, a second operating body 5, an operation switch unit 6, a contact assembly 50, and other parts. The base case 2, as illustrated in FIG. 5, has a rear casing 7, a front casing 8, and an operating shaft retainer 9.

The rear casing 7 is defined in a box shape having an opening 7a opposed to a steering column on which the lever switch 1 is mounted. The front casing 8 is also defined in a box shape having an opening 8a opposed to the opening 7a of the rear casing 7. The front casing 8 is coupled to the rear casing 7 such that the opening 8a aligns with the opening 7a.

The front casing 8 has a wall 8b in the opposed side of the opening 8a. The wall 8b is formed with a through hole 8c extending through the operating shaft 3. The wall 8b has a plurality of grooves 8d (illustrated in FIG. 6 and FIG. 7) axially formed in an inner surface of the through hole 8c.

The operating shaft retainer 9 is received in the rear casing 7 and the front casing 8. The operating shaft retainer 9 includes a base body 11 secured to the front casing 8 with screws 10, a plurality of switches 12, a slide 13 disposed between the base body 11 and the wall 8b, and a connecting tubular piece 14.

The base body 11, which is opposed to the wall 8b of the front casing 8, has a flat surface 11a facing the wall 8b and also has a concave 11b formed in a central portion of the flat surface 11a. The concave 11b has a plurality of grooves 11c each extending radially from a center of the flat surface 11a. The groove 11c is inclined such that the bottom of the groove 11c comes gradually nearer to a flat portion of the flat surface 11a.

The switch 12 has a switch body 12a secured to the base body 11 with a screw 12c and also has a deflectable arm 2b. The deflectable arm 2b is extending from the switch body 12a toward the front casing 8. The deflectable arm 2b is pivotable relative to the switch body 12a.

The switch 12 electrically connects, for example, to the car navigation system. The switch 12 outputs a desired signal to the car navigation system, when the operating shaft 3 turns relative to the base case 2 so that the deflectable arm 2b pivots relative to the switch body 12a.

The slide 13 is defined in a square frame shape having four peripheral plates 13a. The slide 13 has two pairs of pinching protrusions 13b, 13c and has holding protrusions 13d that hold the connecting tubular piece. The pinching protrusions 13b, 13c each are projecting outward from the peripheral plate 13a. Each pair of the pinching protrusions 13b, 13c hold the deflectable arm 2b of the switch 12 therebetween. Each holding protrusion 13d for the connecting tubular piece is projecting inward from one of the peripheral plates 13a.

The connecting tubular piece 14 is disposed between the slide 13 and the wall 8b of the front casing 8. The connecting tubular piece 14 is circular in section and is passed through the operating shaft 3. The connecting tubular piece 14 has a plurality of turn guide protrusions 14a projecting outward and has a plurality of engagement grooves 14b formed an end portion positioned in the side of the slide 13.

Each turn guide protrusion 14a engages with each groove 8d of the front casing 8. The engagement groove 14b has an end positioned in the side of the slide 13 and has a longitudinal extending portion. Each engagement groove 14b engages with one of the holding protrusions 13d for the connecting tubular piece.

Furthermore, the connecting tubular piece 14 receives a fixing pin 15 inwardly inserted therein. The fixing pin 15 prevents a base end 3a of the operating shaft 3, which has been inserted into the connecting tubular piece 14, from drawing out the connecting tubular piece 14. The base end 3a of the operating shaft 3, which has been inserted into the connecting tubular piece 14, receives a coil spring 16, a groove insertion pin 17, etc.

The coil spring 16 resiliently urges the groove insertion pin 17 against the base body 11 and keeps the groove insertion pin 17 at the base end 3a of the operating shaft 3. The groove insertion pin 17 also is positioned in to be partially in the concave 11b of the flat surface 11a of the base body 11.

Since the operating shaft retainer 9 is thus constituted, the connecting tubular piece 14 is coupled to the base end 3a of the operating shaft 3, and the guide protrusion 14a of the connecting tubular piece 14 engages with the groove 8d of the front casing 8. At the same time, the engagement groove 14b engages with the holding protrusion 13d of the connecting tubular piece. Furthermore, the groove insertion pin 17 enters the concave 11b, and the pinching protrusions 13b, 13c hold the deflectable arm 12b therebetween.

Figure 4:
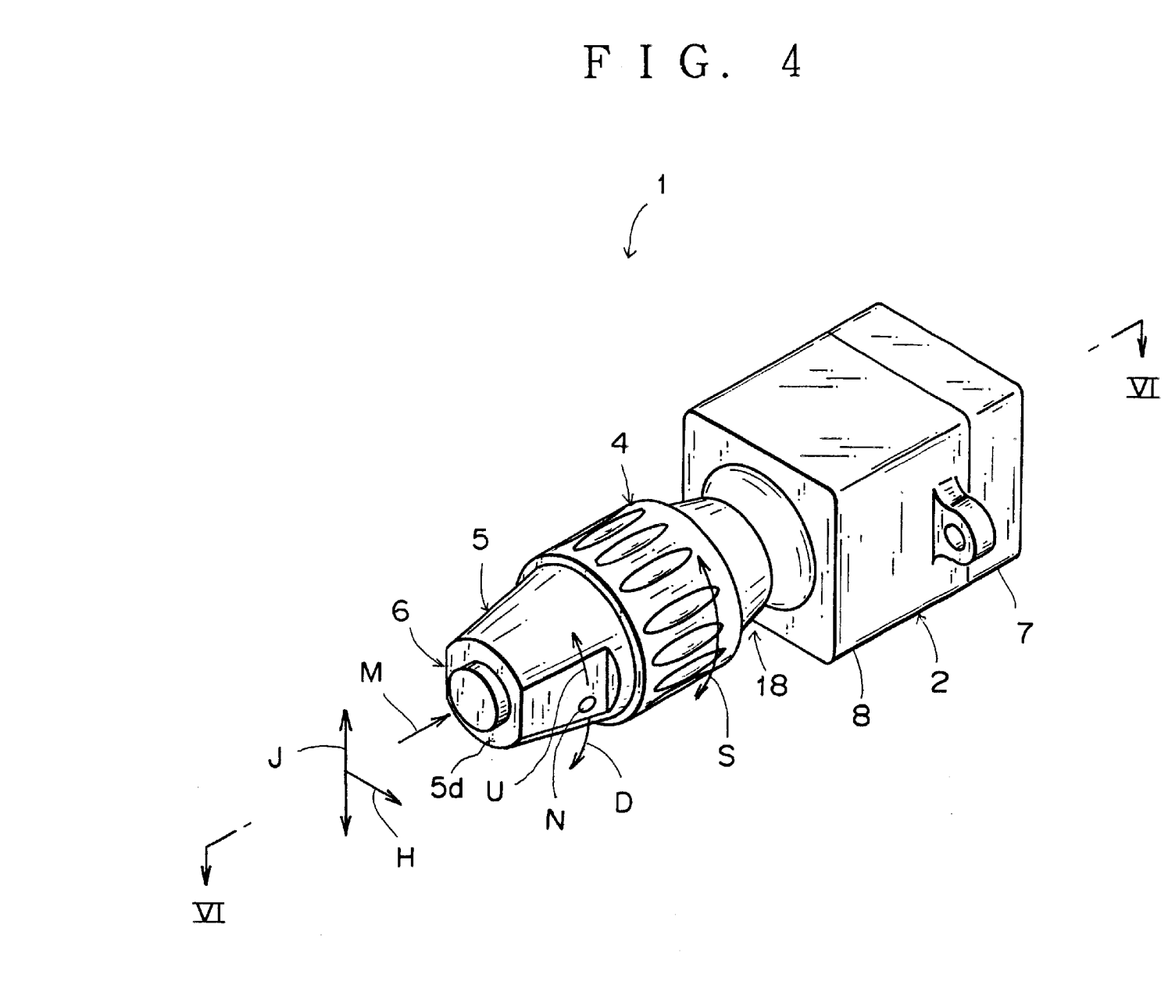
FIG. 4 is a perspective overview showing the lever switch having the contact assembly of the embodiment.

A driver pivots the fore end 3b of the operating shaft 3 along an arrow H or J shown in FIG. 4, so that, as illustrated in FIG. 7, the pivot guide protrusion 14a moves along the groove 8d of the front casing 8, thereby pivoting the operating shaft 3. The slide 13 moves along the flat surface 11a in a direction perpendicular to a shaft center line P of the operating shaft 3. The deflectable arm 2b held between the pinching protrusions 13b, 13c pivots relative to the switch body 12a, thereby outputting a desired signal to the aforementioned equipment (not shown).

When the pivoting force of the operating shaft 3 is released, the resilient force of the coil spring 16 moves the groove insertion pin 17 along the bottom surface of the groove 11c toward the center of the flat surface 11a. Thus, the operating shaft 3 returns to the initial state shown in FIG. 6. The operating shaft 3 is a circular pipe having a generally uniform inner diameter and is extending along the shaft center line P. The base end 3a of the operating shaft 3, as described above, is held by the operating shaft retainer 9 of the base case 2. Meanwhile, the fore end 3b of the operating shaft 3 is extending outward from the base case 2. The fore end 3b of the operating shaft 3 is unitarily formed with a flange 3c outwardly projecting therefrom.

The first operating body 4 consists of a bottom wall 4a and a cylindrical wall 4b. The first operating body 4 is supported by a cap 18 and a fitting piece 19 and can turn around the operating shaft 3. The first operating body 4 is positioned outside the base case 2 in the side of the fore end 3b of the operating shaft 3.

The cap 18 is secured on an outer surface of the operating shaft 3. The cap 18 consists of a bottom wall 18a and a cylindrical wall 18b. Through the bottom wall 18a of the cap 18, the operating shaft 3 passes, and the bottom wall 18a is opposed to the front casing 7. The cap 18 is located at a predetermined position by an E-shaped ring 20.

The fitting piece 19 is secured on an outer surface of the operating shaft 3. The fitting piece 19 has a smaller diameter cylindrical wall 19a, a larger diameter cylindrical wall 19b, and a coupling portion 19c joining the cylindrical walls 19a, 19b. Through the smaller cylindrical wall 19a, the operating shaft 3 is extending. The smaller cylindrical wall 19a is spaced from the bottom wall 18a of the cap 18. The larger cylindrical wall 19b has an operating body retainer 19d at an outer circumference side thereof for supporting the cylindrical wall 4b of the first operating body 4.

The first operating body 4 has the bottom wall 4a allowing the operating shaft 3 to pass through. The bottom wall 4a is sandwiched by the bottom wall 18a of the cap 18 and the cylindrical wall 19a of the fitting piece 19. The cylindrical wall 4b of the first operating body 4 has one end supported by the cylindrical wall 18b of the cap 18. The other end of the cylindrical wall 4b is supported by the operating body retainer 19c of the fitting piece 19.

Surround by the cylindrical wall 4b of the first operating body 4 and the fitting piece 19 having the cylindrical wall 19a and the coupling end 19c, a space K is defined. In the space K, there is provided a rotary encoder 21 which is a detection means for sensing the turn amount of the first operating body 4 around the shaft center line P.

The rotary encoder 21 is electrically connected to the aforementioned equipment such as a car radio. The rotary encoder 21 outputs pulsed signals to the equipment when the turn amount of the first operating body 4 has reach a predetermined angle, for example of 10°.

In addition, the first operating body 4, the cap 18, and the fitting piece 19 each are positioned by the E-shaped ring 20 or another E-shaped ring 60 not to move in the longitudinal direction of the shaft center line P.

The second operating body 5, which is of a generally cylindrical shape, is turnably disposed relative to the operating shaft 3 in the side of the fore end 3b of the operating shaft 3. The second operating body 5 can move toward the side of the base end 3a against the resilient force of a coil spring 24 described later.

The second operating body 5 has a retainer 5a disposed around an outer circumference surface of the operating shaft 3 backward adjacent to the flange 3c. The second operating body 5 also has a truncated-cone-shaped operating piece 5b of a barrel disposed outside the retainer 5a.

The truncated-cone-shaped operating barrel 5b has a locking recess 22 at an end 5c thereof. The locking recess 22 is positioned in the side of the fore end 3b of the operating shaft 3. The locking recess 22 is formed with a shoulder 5e having an inner diameter gradually increasing toward the side of the base end 3a.

The retainer 5a of the second operating body 5 is formed with a plurality of recesses 23 extending parallel to the of the shaft center line P of the operating shaft 3. The recesses 23 are equally spaced from each other in a circumferential direction of the second operating body 5. In the embodiment, there are provided two recesses 23 each having an end opening opposed to a fixed body 55 described later.

Each recess 23 receives a coil spring 24 of a resiliently urging means, such as a coil spring 24, and a rolling body such as a ball 25. The coil spring 24 and the ball 25 turn together with the second operating body 5 around the shaft center line p of the operating shaft 3.

The ball 25 is opposed to the fixed body 55 and can roll on a cam wall, or cam end wall, 59a of the fixed body 55 to be described later. The ball 25 may be replaced by another rolling body such as a roller.

The ball 25, which is resiliently urged by the coil spring 24, rolls on the cam wall 59a to be positioned on an abutment wall 59b (illustrated in FIG. 1) of a cam recess 59 (described later). It is a neutral state N (FIG. 4) of the second operating body 5 in which the ball 25 is positioned on the abutment wall 59b of the cam recess 59.

Turning the second operating body 5 from the neutral state around the operating shaft 3 moves the ball 25 against the resilient force of the coil spring 24 on the cam wall 59a, so that the ball 25 moves away from the cam recess 59 and moves on the cam wall 59a toward the side of the second operating body 5.

When the turning force of the second operating body 5 is released, the coil spring 24 resiliently urges the ball 25 toward the bottom of the cam recess 59 to turn the second operating body 5 toward the neutral state N.

The second operating body 5 has an end 5f positioned in the side of the base end 3a of the operating shaft 3. The end 5f of the second operating body 5 is formed with an operating force transmission structure 26 as illustrated in FIG. 1. The operating force transmission structure 26 is positioned on a circumferential end surface of the second operating body 5.

Figure 2:
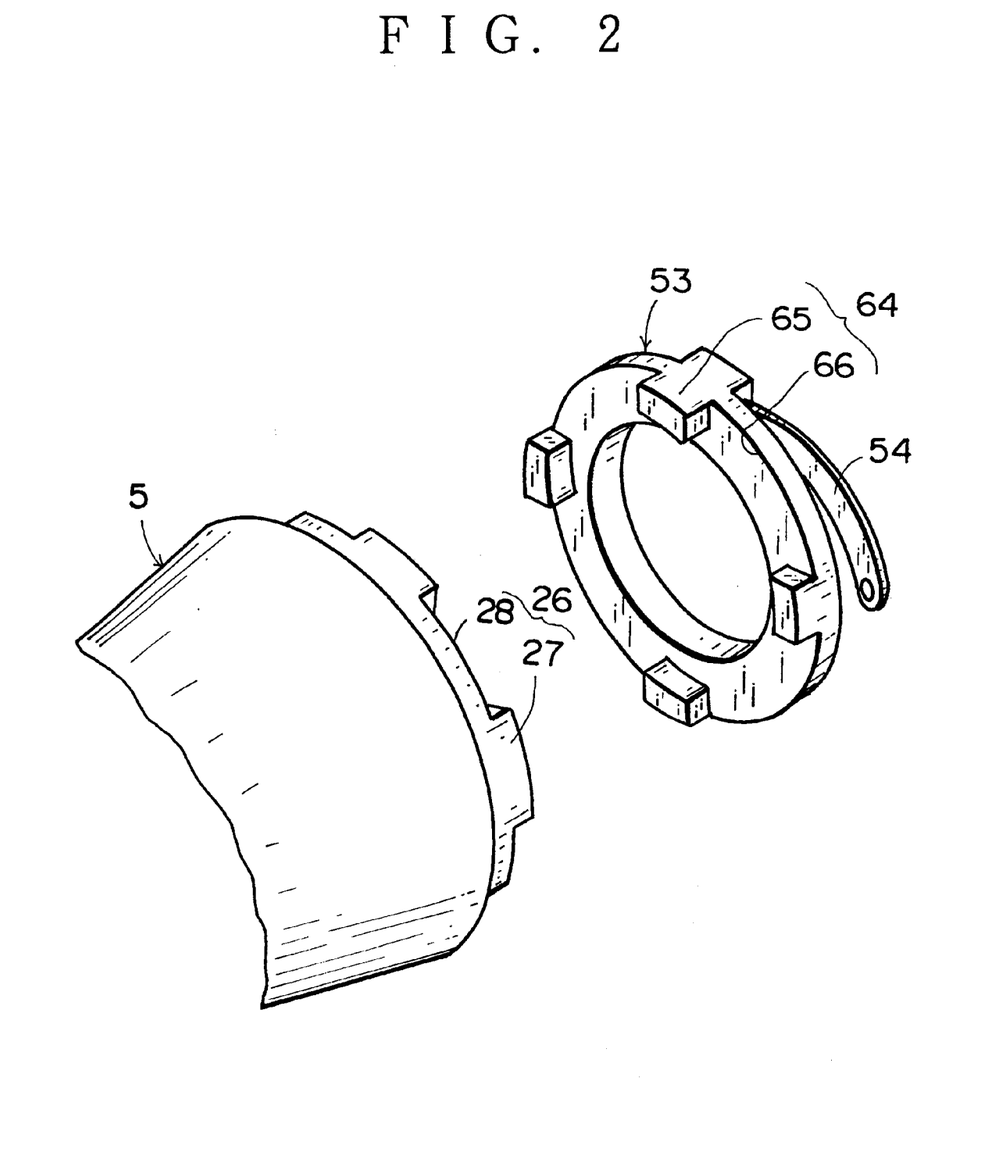
FIG. 2 is a perspective view showing a movable contact piece retainer and a second operating body of the embodiment.
Figure 3:
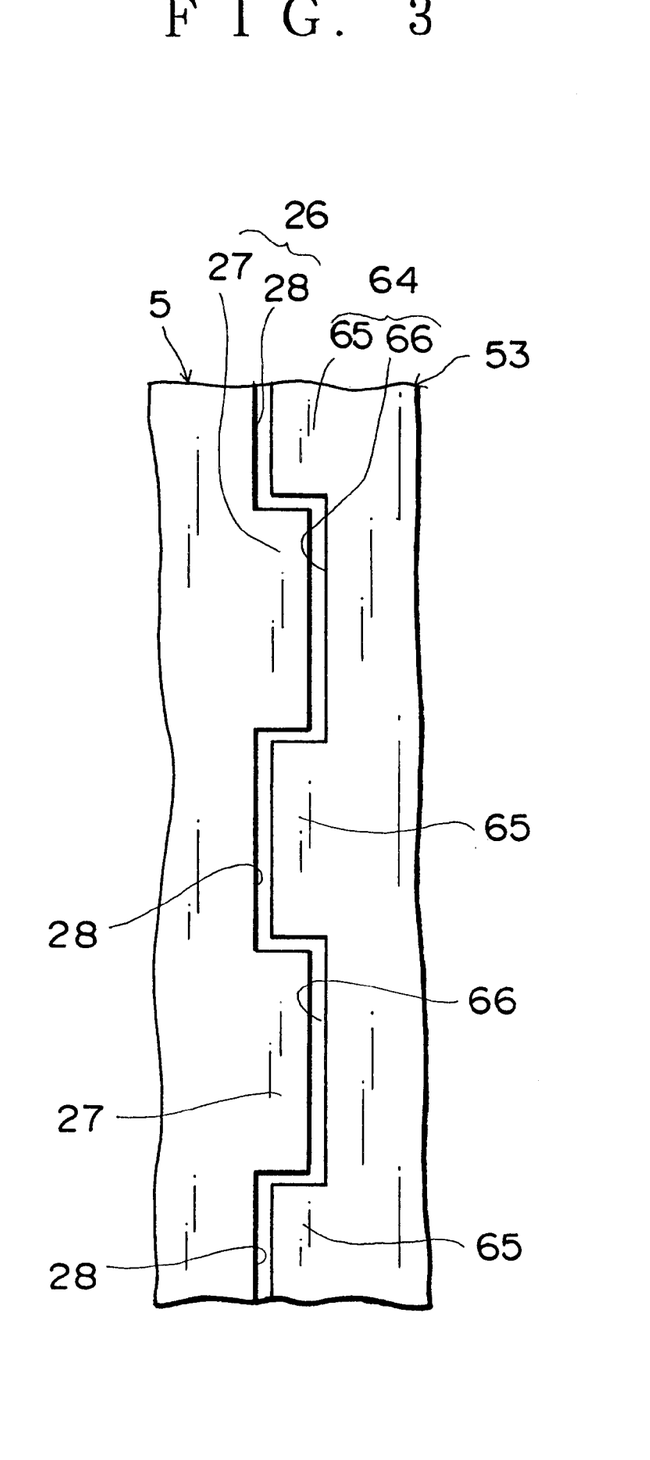
FIG. 3 is a plan view showing an operating force transmission structure and an operating force receiving portion of the embodiment, the view being developed in a circumferential direction thereof.

The operating force transmission structure 26, as illustrated in FIGS. 2, 3, has a plurality of first projections 27 projecting toward a movable contact piece retainer 53 discussed later, that is, toward the side of the base end 3a of the operating shaft 3, and has a plurality of first depressions 28 facing the movable contact piece retainer 53. The operating force transmission structure 26 has the first projections 27 and the first depressions 28 alternately provided in a circumferential direction of the second operating body.

The operation switch unit 6 is mounted on the fore end 3b of the operating shaft 3. The switch unit 6 has a push switch 31 mounted on the fore end 3b of the operating shaft 3 via a fitting piece 29 and an insulating sheet 30. The switch unit 6 also has a switch cover 32 covering the switch 31 from the side of the fore end 3b of the operating shaft 3.

The push switch 31 has a switch body 31a and an operating protrusion 31b that comes into and comes out of the switch body 31a. The switch body 31a is mounted on the fore end 3b of the operating shaft 3 via the fitting piece 29 and the insulating sheet 30. The operating protrusion 31b is resiliently urged to come out from the switch body 31a by a spring (not shown).

The switch body 31 a of the push switch 31 fitted on the operating shaft 3 such that the operating protrusion 3b projecting toward the side of the fore end 3b of the operating shaft 3. The switch 31 can electrically connect to electrical equipment such as a car navigation system (not shown) . Pushing the operating protrusion 3 1b of the push switch 31 outputs a desired signal to the car navigation system.

Between the push switch 31 and the switch cover 32, there is disposed a switch holder 33. The switch holder 33 consists of a bottom wall 33a and a cylindrical wall 33b. The bottom wall 33a is formed with a through hole 33c through which the operating protrusion 31b of the push switch 31 is exposed.

The switch holder 33 is fitted to the fore end 3b of the operating shaft 3, such that the bottom wall 33a is positioned in the side of the fore end 3b of the operating shaft 3 and the operating protrusion 31b is exposed from the through hole 33c.

The switch cover 32 has a cylindrical wall 32b having a bottom wall 32a. The cylindrical wall 32b has a locking hook 32c engaging with a shoulder 5e of the locking recess 22. The locking hook 32c has a hooking piece projecting outward from an outer end surface of the cylindrical wall 32b.

The bottom wall 32a has a projection 32d opposed to the operating protrusion 31b of the push switch 31 when the locking hook 32c has engaged with the shoulder 5e of the locking recess 22. The projection 32d protrudes from an inner surface of the bottom wall 32a to be opposed to the operating protrusion 31b. The projection 32d has a size which can come into the switch holder 33 via the through hole 33c.

The switch cover 32 is engaged with the second operating body 5, while the locking hook 32c of cylindrical wall 32d engages with the shoulder 5e of the locking recess 22 and the projection 32d is opposed to the operating protrusion 31b.

In addition, between the switch cover 32 and the switch holder 33, there is provided a coil spring 34. The coil spring 34 resiliently urges the switch cover 32 outward from the switch holder 33, that is, forward relative to the fore end 3b of the operating shaft 3.

Pushing the switch cover 32 against the resilient force of the coil spring 34 toward the base end 3a of the operating shaft 3 causes the projection 32d to enter the switch holder 33 via the through hole 33c. This pushes the operating protrusion 31b into the switch body 31a. Thereby, the push switch 31 outputs a desired signal to the electrical equipment such as the car navigation system.

Meanwhile, releasing the push of the switch cover 32 causes the operating protrusion 31b to return to its original position by the resilient force of the spring (not shown). Thus, the operating protrusion 31b comes out from the switch body 31a, and the switch cover 32 returns to its original position in which the projection 32d is spaced from the operating protrusion 31b by the resilient force of the coil spring 34.

The contact assembly 50 is disposed inside the larger cylindrical wall 19b of the fitting piece 19. The contact assembly 50 can connect to the base end 3a of the operating shaft 3, which transmits a signal to know whether the first operating body 4 has been turned or not.

The contact assembly 50, as illustrated in FIG. 1, includes a fixed contact piece plate 51, another fixed contact piece 52, a movable contact piece retainer 53 turning with the second operating body 5, a flat spring 54 that is a movable contact piece, a fixed body 55 secured to the operating shaft 3, etc.

The fixed body 55 has an annular shape and engages with an outer circumferential surface of the operating shaft to secured thereto. The fixed body 55 has one end 55a opposed to an insulating sheet 56 described later and the other end 55b opposed to the second operating body 5. The other end 55b is the cam surface described in the summary of the invention.

The fixed body 55 has a first shoulder 57 having a smaller diameter at the one end 55a and a shoulder 58 having a larger diameter near the other end 55b. A fixed contact piece plate 51 engages with an outer circumferential surface of the one end 55a of the fixed body 55 in the side of the insulating sheet 56 so that the fixed contact piece plate 51 is secured to the fixed body 55. The second shoulder 58 abuts against an end portion 53c(discussed later) of the movable contact piece retainer 53 to position the movable contact piece retainer 53.

The fixed body 55 is provided with a plurality of cam recesses 59 opposed to the other end 55b. Each cam recess 59 is defined in front of the other end 55b and is positioned rearward from an end face 55c of the fixed body 55. The plural cam recesses 59 are substantially equally spaced from each other around the shaft center line P of the operating shaft 3 when the fixed body 55 has been secured to the operating shaft 3. In the illustrated embodiment, there are provided two cam recesses 59.

The cam recess 59 has a pair of cam walls 59a each of which is inclined both to a circumferential direction of the fixed body 5 and to the shaft center line P. The pair of cam walls 59a are positioned to have a bottom of the cam recess 59 therebetween. Each cam wall 59a extends to the end face 55c of the abutment wall 59b.

The fixed contact piece plate 51 is of an annular shape. The fixed contact piece plate 51 engages with an outer circumferential surface of the fixed body 55 to be secured to the fixed body 55. Hence, the fixed contact piece plate 51 is secured to the operating shaft 3.

The fixed contact piece plate 51 is positioned adjacent to the end portion 55a in the rear of the first shoulder 57 of the fixed body 55. The fixed contact piece plate 51, as illustrated in FIGS. 5, 6, and 7, is opposed to the coupling end 19c of the fitting piece 19. Between the fixed contact piece plate 51 and the coupling end 19c of the fitting piece 19, there are provided the insulating sheet 56 and the E-shaped ring 60.

The fixed contact piece 52 is positioned on the end face 51a of the fixed contact piece plate 51 so as to be opposed to the second operating body 5 in the side of the fore end 3b of the operating shaft 3. The fixed contact piece 52 is of an arc shape co-axial with the fixed contact piece plate 51.

The fixed contact piece 52 makes contact with the flat spring 54 to electrically connect to each other when the second operating body 5 turns around the shaft center line P against the resilient force of the coil spring 24. Meanwhile, the fixed contact piece 52 does not connect to the flat spring 54 when the second operating body 5 returns to the neutral position N by the resilient force of the coil spring 24. That is, the fixed contact piece 52 makes contact with the flat spring 54 only when the second operating body 5 has been turned against the resilient force of the coil spring 24.

The movable contact piece retainer 53 is defined in an annular shape having an inner diameter surrounding an outer diameter of the fixed body 55. The movable contact piece retainer 53 is opposed to both the second operating body 5 and the fixed contact piece 52. The movable contact piece retainer 53 holds the flat spring 54 on the end face 53a opposed to of the fixed contact piece 52.

That is, the flat spring 54 is positioned outside the fixed body 55 in a circumferential direction of the shaft center line P between the second operating body 5 and the fixed contact piece 52. The flat spring 54 is of an arc shape along a circumferential direction of the movable contact piece retainer 53. The flat spring 54 abuts against the fixed contact piece plate 51 and the fixed contact piece 52, so that the resilient force of the flat spring 54 makes the movable contact piece retainer 53 move in the direction opposite to the fixed contact piece 52.

The flat spring 54 is spaced from the fixed contact piece 52 while the second operating body 5 is at the neutral N position. The flat spring 54 makes contact with the fixed contact piece 52 to electrically connect thereto, when the second operating body 5 is turned along an arrow U or D of FIG. 4.

The movable contact piece retainer 53 has a support surface 53b abutting against the second shoulder 58 of the fixed body 55, when the flat spring 54 resiliently urges the movable contact piece retainer 53 in the direction opposite to the fixed contact piece 52. The support surface 53b is flat in a radial direction of the movable contact piece retainer 53. The movable contact piece retainer 53 is positioned relative to the shaft center line P by the resilient force of the flat spring 54 and by the second shoulder 58.

Furthermore, the movable contact piece retainer 53 has an operating force receiving portion 64 at the end portion 53c opposed to the second operating body 5. The operating force receiving portion 64 is formed in a circumferential direction of the movable contact piece retainer 53.

The operating force receiving portion 64, as illustrated in FIGS. 2, 3, has a plurality of second projections 65 projecting toward the second operating body 5 and has a plurality of second depressions 66 opposed to the second operating body 5. The second projections 65 and the second depressions 66 are alternately positioned along in a circumferential direction of the movable contact piece retainer 53.

The second operating body 5 is positioned opposite to the movable contact piece retainer 53 such that each first projection 27 engages with one of the second depressions 66 while each second projection 65 engages one of the first depressions 28. The opposed second operating body 5 and the movable contact piece retainer 53 can turn together.

The contact assembly 50 is provided with a first clearance 61, a second clearance 62, and a third clearance 63, when the movable contact piece retainer 53 is positioned by the resilient force of the flat spring 54 and by the second shoulder 58 parallel to the shaft center line P.

The first clearance 61 is provided between the movable contact piece retainer 53 and the fixed contact piece 52. The first clearance 61 has a first size T1 parallel to the shaft center line P. The second clearance 62 is provided between an end face of the first projection 27 and a bottom face of the second depression 56 as well as between an end face of the second projection 55 and a bottom face of the first depression 28. That is, the second clearance 62 is provided between the movable contact piece retainer 53 and the second operating body 5. The second clearance 62 has a second size T2 parallel to the shaft center line P.

The third clearance 63 is provided between the fixed body 55 and the second operating body 5. The third clearance 63 has a third size T3 parallel to the shaft center line P. Third size T3 is smaller than the second size T2.

Next, operations of the lever switch 1 will be discussed. Pushing the switch cover 32 along an arrow M of FIG. 4 into the end face 5d of the second operating body 5 causes the operating protrusion 31b of the switch 31 to be pressed into the switch body 31a. Thereby, the switch 31 outputs a desired signal to the car navigation system, which displays, for example, traffic information.

Turning the first operating body 4 along an arrow S of FIG. 4 around the operating shaft 3 causes the rotary encoder 21 to output a pulsed signal to the car radio every predetermined turn angle of the first operating body 4. This changes the volume of the car radio.

Turning the second operating body 5 from the neutral position N along an arrow U or D causes the flat spring 54 to make contact with the fixed contact piece 52 to be electrically connected thereto. This, for example, changes a set frequency of the radio for selection of radio channels. Meanwhile, releasing the turning force of the second operating body 5 causes the second operating body 5 to return to the neutral position N due to the resilient force of the coil spring 24.

Pivoting the whole body of the lever switch 1 along an arrow H of FIG. 4 causes the deflectable arm 2b of the switch 12 to swing relative to the switch body 12a, outputting a desired signal to the car navigation system. Thereby, the car navigation system displays, for example, a present position of the car.

Furthermore, pivoting vertical the whole body of the lever switch 1 along an arrow J of FIG. 4 causes the deflectable arm 12b of the switch 12 to swing relative to the switch body 12a, outputting a desired signal to the car navigation system. Thereby, the car navigation system, for example, changes map information to display a wide-range map or a narrow-range, detailed map.

Next, operational effects of the contact assembly 50 of the lever switch 1 will be discussed. The contact assembly 50 has the movable contact piece 53 retainer disposed between the second operating body 5 and the fixed contact piece 52. In the contact assembly 50, the first clearance 61 having the first size T1 is provided between the movable contact piece retainer 53 and the fixed contact piece 52 in the longitudinal direction of the shaft center line P, and the second clearance 62 having the second size T2 is provided between the movable contact piece retainer 53 and the second operating body 5 in the longitudinal direction of the shaft center line P.

Thus, the movable contact piece retainer 53 of the contact assembly 50 adjusts the contact force between the flat spring 54 and the fixed contact piece 52 during the turning of the second operating body 5. Accordingly, the contact assembly 50 ensures a reliable contact between the flat spring 54 and the fixed contact piece 52.

The adjusted contact force between the flat spring 54 and the fixed contact piece 52 prevents a with-time deformation of the flat spring 54 and the fixed contact piece 52. Thus, the contact assembly 50 is useful for preventing an incorrect electrical connection between the flat spring 54 and the fixed contact piece 52.

The contact assembly 50 is further provided with the third clearance 63 between the fixed body 55 and the second operating body 5. The third clearance 63 has the third size T3 smaller than the second size T2. The second operating body 5 is resiliently urged by the coil spring 24 in the direction opposite to the fixed body 55.

Thereby, the second operating body 5 does not contact the movable contact piece retainer 53, when the second operating body 5, which is turned to push the second operating body 5 toward the first operating body 4, makes contact with the fixed body 55. Thus, the contact assembly 50 adjusts the contact force between the flat spring 54 and the fixed contact piece 52 during the turning of the second operating body 5. Accordingly, the contact assembly 50 ensures a reliable contact between the flat spring 54 and the fixed contact piece 52.

The contact assembly 50 uses the flat spring 54 as a movable contact piece for resiliently urging the movable contact piece retainer 53 in the direction opposite to the fixed contact piece 52. The flat spring 54 resiliently deforms when the flat spring 54 is pressed against the fixed contact piece 52 via the movable contact piece retainer 53. Thus, the contact assembly 50 can adjust better a contact force between the flat spring 54 and the fixed contact piece 52.

As a result, the contact assembly 50 further ensures a reliable contact between the flat spring 54 and the fixed contact piece 52. The contact assembly 50 further prevents a with-time deformation of the flat spring 54 and the fixed contact piece 52. Thus, the contact assembly 50 is further useful for preventing an incorrect electrical connection between the flat spring 54 and the fixed contact piece 52.

What is claimed is:

1. A lever switch including a shaft, an operating body turnable around said shaft, and a contact assembly, said contact assembly comprising:

a fixed contact piece secured to said shaft;

a movable contact piece retainer disposed between said operating body and said fixed contact piece and being opposed to the operating body and the fixed contact piece in the longitudinal direction of said shaft, said movable contact piece retainer being rotatable, about said shaft, relative to said fixed contact piece and being engaged with said operating body such that said movable contact piece retainer is rotated by turning of said operating body; and a movable contact piece mounted on said movable contact piece retainer and slidingly contacting said fixed contact piece upon rotation of said movable contact piece retainer;

wherein a first clearance is provided between said movable contact piece retainer and said fixed contact piece in the longitudinal direction of said shaft, and a second clearance is provided between said movable contact piece retainer and said operating body in the longitudinal direction of said shaft.

2. The lever switch set forth in claim 1, wherein said movable contact piece retainer is formed in a circular ring shape, and said contact assembly further comprises:

a fixed body fixed to said shaft and positioned adjacent to an inner periphery of said movable contact piece retainer, said fixed body being axially opposed to said operating body, a resiliently urging means mounted between said fixed body and said operating body so as to resiliently bias said the operating body in a direction opposed to the fixed body, and a third clearance provided between said fixed body and said operating body, the third clearance being smaller than the second clearance in size.

3. The lever switch set forth in claim 2, wherein said resiliently urging means is axially positioned in a recess of said operating body, and said fixed body is formed in a cylindrical shape, said fixed body having a cam end wall opposed to said the operating body, said cam end wall comprising at least one cam recess including recess walls each of which is inclined in axial and circumferential radial directions of said fixed body, said recess walls abutting against a rolling body resiliently urged by said resiliently urging means toward said fixed body such that said rolling body is urged to a bottom of the cam recess.

4. The lever switch set forth in claim 1, wherein said operating body is formed with a first projection and a first depression which are opposed to said movable contact piece retainer at one end of said operating body, while said movable contact piece retainer is formed with a second projection and a second depression which are opposed to said operating body at one end of said movable contact piece retainer, wherein said first projection engages with said second depression and said second projection engages with said first depression so that said operating body can turn around said shaft together with said movable contact piece retainer.

5. The lever switch set forth in claim 1, wherein said movable contact piece makes contact with said fixed contact piece, and said movable contact piece is a flat spring resiliently urging said movable contact piece retainer in a direction opposed to the fixed contact piece.

* * * * *